(Model.)
S. W. GRABEL & C. T. STAUFENBEIL.
HORSE COLLAR.
No. 246,386. Patented Aug. 30, 1881.
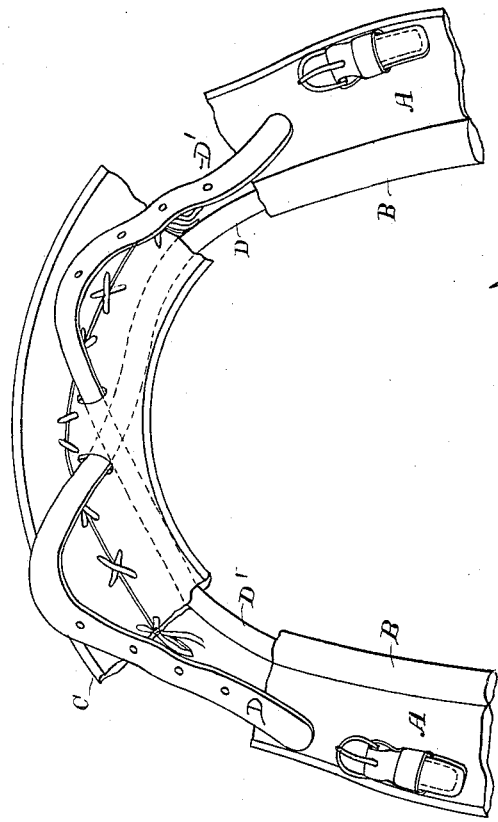
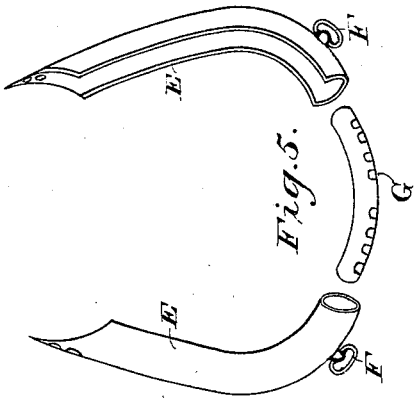
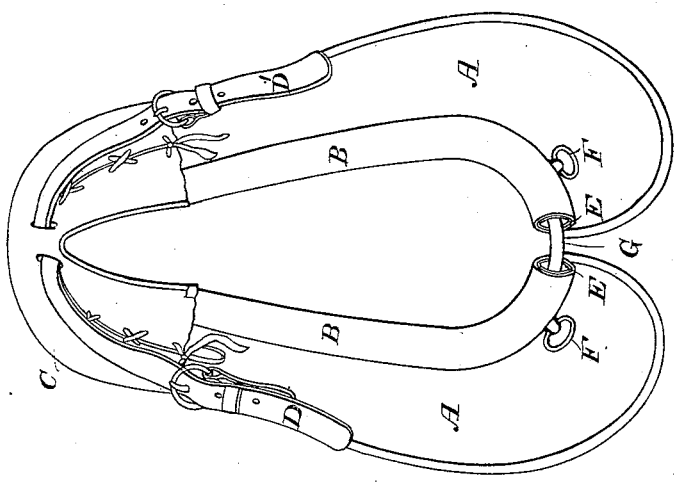
WITNESSES
Wm A. Skinkle
Jos. S. Latimer
INVENTORS.
Samuel W. Grabel,
Charles T. Staufenbeil.
By their Attorneys
Baldwin, Hopkins, & Peyton.
N. PETERS. Photo-Lithographer, Washington. D. C.

UNITED STATES PATENT OFFICE.

SAMUEL W. GRABEL AND CHARLES T. STAUFENBEIL, OF VENTURA COUNTY, CALIFORNIA.

HORSE-COLLAR.

SPECIFICATION forming part of Letters Patent No. 246,386, dated August 30, 1881.

Application filed March 26, 1881. (Model.)

*To all whom it may concern:*

Be it known that we, SAMUEL WILLIAM GRABEL and CHARLES TRAUGOTT STAUFENBEIL, both of Ventura county, in the State of California, have invented certain new and useful Improvements in Horse-Collars, of which the following is a specification.

The object of our invention is to provide an adjustable collar which can readily be adapted to animals of different sizes. To this end we make the collar so that it can be adjusted both at the top and bottom to insure a perfect and even fit to the neck of the animal.

Our improved collar can also be put on and taken off the neck of the animal with great facility.

In the accompanying drawings, Figure 1 is a front view of one of our improved collars. Fig. 2 is a view, partly broken away, of the upper portion of the collar; and Figs. 3, 4, and 5 are detail views.

The shoulder or main portion A of the collar is of leather and stuffed, as usual. The rim or parts B B, around which the hames are fastened, are of the usual shape, but contain two curved tubular metallic parts, E E, which extend from the bottom or throat of the collar up into the rim, on each side.

The collar is practically composed of two sections, which are adjustably united at the top and bottom in the following manner: At the top the parts are flexibly united by the pocket-pad C, which is a leather tube, into which the upper ends of the collar-sections enter, the tube being snugly laced up, as shown in the drawings. The sections of the collar are prevented from slipping out of the pad, and are adjusted by straps D D', which pass from the under side of each section through the pad half-way, and then pass out of the pad to the buckle on the front side of the opposite section. The upper part of the collar can thus readily be enlarged or reduced in size, and being flexible will adapt itself to the necks of different animals. The sections of the collar are connected at the bottom throat by a curved notched bar, G, which works in the tubular parts E E, and is secured therein by the set-screws F F. By adjusting this bar the size of the collar at the bottom can readily be regulated, and by loosening one of the set-screws the collar can be opened at the throat, so that it can be placed over the neck of the animal and then fastened.

The tubes E E extend well up into the collar, so as to stiffen it, and are cut away, as shown, so as to be longer on the outside, and perforated at their upper ends, so that they can be riveted or secured to the rim B.

Collars made as above described possess many advantages in the way of adjustability, and readily adapt themselves to the shape of the neck of the animal wearing them.

We are aware that collars adjustable both at top and bottom are old, and that it is not new to make a collar that will open at the throat so as to pass over the neck of the animal, and we do not claim such subject; but, Having described our invention, what we claim as new, and desire to secure by Letters Patent, is—

1. In a horse-collar, the combination, with the neck pad or tube C, of the collar-sections, the upper ends of which enter the tube and are adjustably held therein by straps, one for each section, which straps pass in opposite directions half-way through the tube and then out to the buckles on the collar-sections, substantially as described.

2. The combination, substantially as herein set forth, of the sections of the collar having the tubular parts E E secured in the rim thereof, which parts shape and stiffen the rim, as described, the notched bar which works in the tubular parts, and the set-screws.

In testimony whereof we have hereunto subscribed our names this 11th day of June, A. D. 1881.

SAMUEL WILLIAM GRABEL.
CHARLES TRAUGOTT STAUFENBEIL.

Witnesses:
E. S. HALL,
C. A. BARLOW.